May 27, 1930.  D. S. BARROWS  1,760,105
DUST GUARD
Filed June 27, 1923  2 Sheets-Sheet 1

Inventor
Donald S Burrows
By Ernest F Mechlin
his Attorney

May 27, 1930.　　　D. S. BARROWS　　　1,760,105
DUST GUARD
Filed June 27, 1923　　2 Sheets-Sheet 2
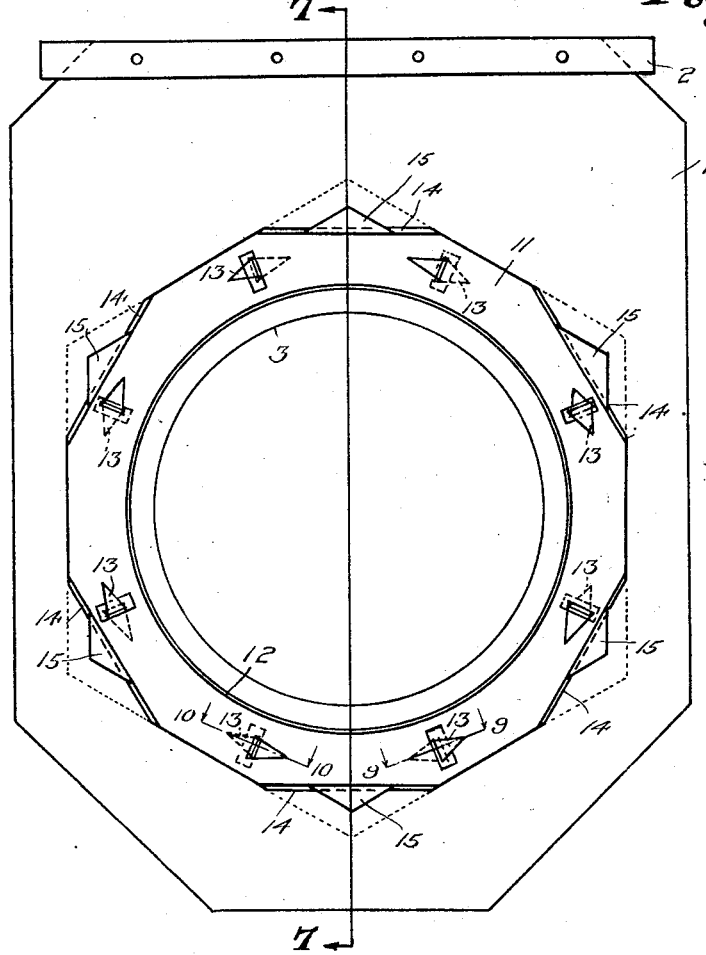
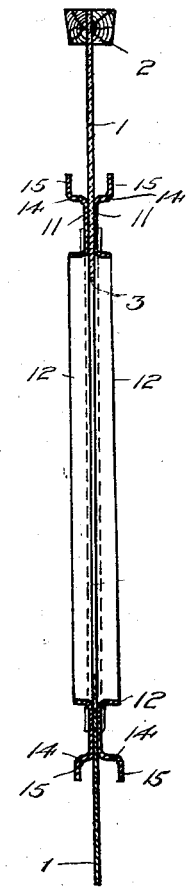

Patented May 27, 1930

1,760,105

UNITED STATES PATENT OFFICE

DONALD S. BARROWS, OF ROCHESTER, NEW YORK, ASSIGNOR, BY MESNE ASSIGNMENTS, TO THE SYMINGTON COMPANY, A CORPORATION OF MARYLAND

DUST GUARD

Application filed June 27, 1923. Serial No. 648,102.

The invention relates to dust guards for journal boxes and particularly to those designed for use in connection with railway cars.

One of the principal features of the present invention is to produce a dust guard which can be inexpensively manufactured by stamping from relatively thin metal that portion of the guard which forms the surrounding bearing and reinforcing member, said member being connected to the curtain near the opening therein by means preferably formed integral with the said bearing member.

Another object of the invention is to provide a dust guard composed of a flexible curtain and support therefor, and involving a bearing member formed of two flanged rings preferably stamped from relatively thin material and suitably cut to provide a series of attaching tangs or tongues which penetrate the flexible curtain to firmly clamp the bearing member thereto, each of said flanged rings being provided with a plurality of portions capable of being bent outwardly upon each side of the curtain and adapted to center the guard within the dust well and prevent any part of the ring bearing member catching in the opening in the dust well walls of the journal box.

A further object of the invention is to provide a strong and reliable metallic bearing member as a substitute for the wooden bearing member now in use, said metallic bearing member being formed by stamping relatively thin ring sections, each of which is formed with an annular flanged portion, a plurality of centering projections, and a series of curtain attaching tangs.

The invention further consists in the combination and construction of the several parts hereinafter described and pointed out in the claims.

In the drawings wherein I have illustrated two embodiments of my invention and in which similar reference characters designate corresponding parts in the several views:

Figure 6 is a view in elevation of another form of my improved dust guard.

Figure 7 is a vertical sectional view on the line 7—7 of Figure 6.

Figure 8 is a bottom plan view of the curtain and surrounding bearing member shown in Figure 6.

Figures 9 and 10 are detail sectional views respectively on the line 9—9 and 10—10 of Figure 6 illustrating the alternate disposition of the attaching tangs carried by the respective ring sections of the bearing member.

Figure 2:
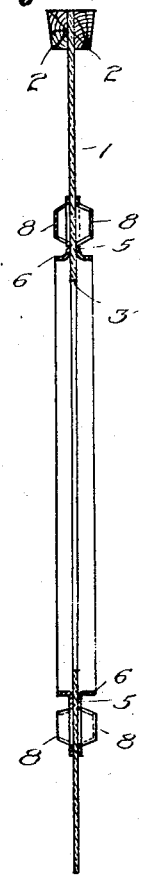
Figure 2 is a vertical sectional view on the line 2—2 of Figure 1, viewed in the direction of the arrows.
Figure 5:
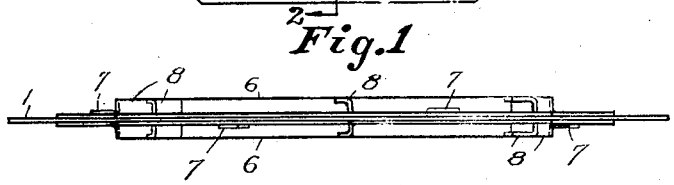
Figure 5 is a bottom plan view of the curtain and ring sections which form the bearing member thereof.

Referring to the embodiment of my invention as illustrated in Figures 1 to 5, the dust guard comprises, among other things, a screen or curtain 1 of heavy textile material such, for example, as canvas, said curtain being provided at its upper end with a supporting member 2. The support for the curtain is in the form of a bar, preferably wedge-shaped in cross section, said bar being divided longitudinally to receive the upper edge of the curtain, as best shown in Figure 2. The wedge-like support is adapted to be positioned in the mouth of the journal box well and preferably forced down level with the top of the box and retained therein by friction. The curtain, as a result of this construction is suspended transversely of the opening in the journal box into which the shaft extends, the vertical and lateral dimensions of said curtain being preferably slightly greater than the corresponding dimensions of the well.

An opening 3, preferably circular in form and of a diameter slightly less than the diameter of the journal or axle at this point is formed near the center of the screen. This opening receives the end of the shaft or journal, the edges of the material adjacent said opening being adapted to contact or wipe said shaft. Surrounding the opening 3 in the curtain and located near the edges of said opening is a relatively thin member 4 having a bearing portion adapted to co-act with the shaft or journal and edge portion of the curtain contacting said shaft or journal, said member being connected to the curtain by a plurality of attaching means and being also provided with another portion adapted to guide and center the dust guard within the well. The relatively thin member 4 is composed of metallic ring-like sections 5 arranged upon opposite sides of the curtain, each of said ring-like members being provided with a relatively thin flat web portion contacting an adjacent face of the curtain, and an outstanding annular flange 6 adapted, when the dust guard is positioned in the journal box, to be separated from the shaft or journal bearing by an intervening space. The flange 6 of one of the ring-like members adjacent one face of the curtain is arranged in axial alinement with the flange 6 provided on the complementary ring-like member positioned adjacent the opposite face of the curtain, the respective flanges of said ring-like sections providing a circular bearing portion surrounding the journal.

Figure 3:
Figure 3 is a detail sectional view on the line 3—3 of Figure 1 showing the attaching tang of one of the ring sections passing through the curtain and being bent against the side of its co-acting ring section.
Figure 4:
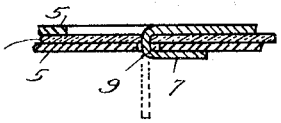
Figure 4 is a similar view on the line 4—4 of Figure 1, illustrating the attaching tang as carried by the other of said ring sections and passing through the curtain in dotted lines for bending against the co-acting ring section, as shown in full lines.
Figure 1:
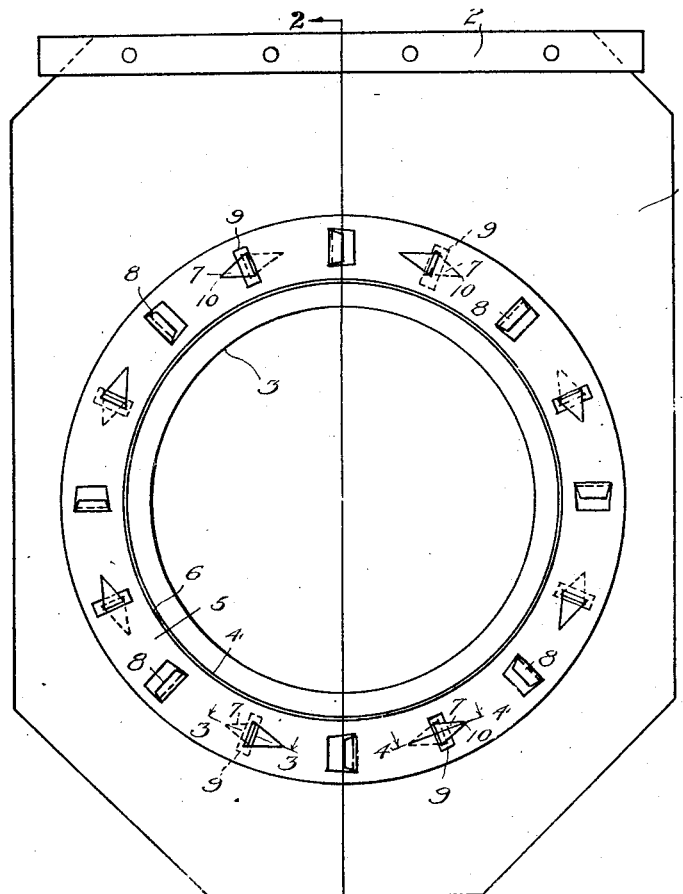
Figure 1 is a view in elevation of my improved dust guard.

The ring-like sections are preferably stamped from thin metal, the web portions of said sections being also cut to provide a plurality of attaching tangs or tongues 7 and a series of centering projections 8. The tang cut from one of the ring sections is adapted to be passed through the curtain and a slot 9 in the complementary ring section, said tang being then pressed flat against said last named ring section as shown in Figure 3. The adjacent attaching tang is preferably alternated, that is the tang is cut from the opposite section, passed through the curtain and a slot in the adjacent ring section, whereupon it is bent flat against said last named ring section, as best shown in Figure 4. The tangs are preferably cut so as to provide a penetrating point 10 which easily passes through the flexible curtain, a plurality of said tangs being preferably used to firmly connect the metallic ring sections to the curtain at numerous points.

The centering projections 8 are preferably interposed between the attaching tangs, each of said projections comprising a substantially rectangular tang adapted to be bent outwardly from the web portion of the ring section. When the dust guard is positioned within the well the projections 8 are adapted to contact the opposite side walls thereof and maintain the guard in a central position.

In the embodiment of my invention disclosed in Figures 6 to 10, the metallic ring-like members 11 are stamped with their peripheral edges in the nature of polygons, the form selected and shown herein being that of a hexagon. Each of the ring-like or plate members 11 is provided with an annular internal flange 12, the flanges of adjacent members being axially alined to provide the bearing portion co-acting with the journal or shaft. A plurality of attaching tangs 13 is used to firmly connect the sections 11 to opposite sides of the curtain and to each other.

The centering means used in connection with this second embodiment of my invention involves a plurality of offset portions 14, said portions being formed by bending the points or corners of the peripheral edge formed at the juncture of adjacent sides of the polygonally shaped peripheral edge. The bent portions of each of the ring sections 11 are shaped to form a Z, the outermost bent portion providing a relatively flat surface 15 adapted to contact the side walls of the well and provide an effective centering means for the dust guard.

A dust guard manufactured in accordance with my present invention provides a comparatively simple construction in which the ring-like sections can be produced from very thin material and at the same time provide a sufficient reinforcement for the curtain to lend weight thereto and contribute to the swinging capacity thereof, as will be understood. It will also be observed that by forming the integral attaching means on the ring-like bearing members, the utilization of rivets and the expense incident thereto is eliminated. While I have shown my invention as comprising circular and hexagonal ring members, it will be understood that other shapes can be utilized to effect a saving of the material from which the ring members are stamped.

I claim:

1. A journal box dust guard comprising a curtain of flexible material having an opening therein, means for supporting said curtain within the well of the journal box, a bearing member surrounding said opening and spaced from the side edges of said curtain, said bearing member being formed of relatively thin metal sections arranged upon opposite sides of the curtain, each of said sections having a portion providing an annular flange disposed near said opening and means integral therewith for intersection and connection with the curtain and the other section.

2. A dust guard for journal boxes and the like comprising a flexible curtain having a shaft or journal receiving opening therein, the marginal edge of the said opening being adapted to contact the shaft or journal, a metallic bearing member surrounding said opening and provided with an axially projecting flange adapted to embrace the said shaft, and means struck from said bearing member and adapted to extend through said curtain for connecting said metallic bearing member to the same and a corresponding member in the other side.

3. A dust guard for journal boxes and the like comprising a flexible curtain having an opening therein adapted to receive a journal, the marginal edge of the said opening being adapted to wipe said journal, a pair of relatively thin members adapted to surround the said opening near the edge thereof, each of said members having a flange adapted to form a collar for maintaining the edge of the opening in contact with the journal, and means for connecting said relatively thin members to the curtain with their respective flanges in axial alinement with the journal, said means comprising tabs struck from a member, extending through the curtain and interlocking with the other member.

4. A dust guard for journal boxes and the like comprising a flexible curtain having an opening therein adapted to receive a journal, the marginal edge of the said opening being adapted to wipe said journal, a bearing member composed of relatively thin ring-like sections arranged upon opposite sides of the curtain and adapted to surround the opening therein, each of said sections being provided with a collar portion adapted to provide a bearing for maintaining the edge of the opening in contact with the journal, and portions of said ring sections cut therefrom to provide tabs for connecting the same to the curtain.

5. A dust guard for journal boxes and the like comprising a flexible curtain having an opening therein adapted to receive a journal, the marginal edge of the said opening being adapted to wipe said journal, a metallic bearing member composed of two relatively thin continuous metal plates arranged upon opposite sides of the curtain and adapted to surround the opening therein, means integrally carried by said plates for passing through and connecting the same to the curtain, and means provided on said plates adapted to center the dust guard when positioned within the well of the journal box.

6. A dust guard for journal boxes and the like comprising a flexible curtain having an opening therein adapted to receive a journal, the marginal edge of the said opening being adapted to wipe said journal, a bearing member composed of a pair of ring sections arranged upon opposite sides of the curtain and surrounding the opening therein, and connecting means for said ring sections including a bendable tang integrally carried by one of said sections and bent against the other of said sections after passing through the curtain.

7. A journal box dust guard comprising a curtain of flexible material, a support for said curtain adapted to fit within the mouth of a dust guard well, said curtain hanging freely from its support and having an opening disposed to receive the shaft with the edge of the material adjacent said opening contacting said shaft, and a metallic member located near the edges of the opening in the curtain, said member being provided with a series of projections some of which are adapted to center the dust guard within the well and others of which are adapted to connect said member to the curtain.

8. A journal box dust guard comprising a curtain of flexible material, a support for said curtain adapted to fit within the mouth of the well, said curtain hanging freely from its support and having an opening disposed to receive the shaft with the edge of the material adjacent said opening contacting said shaft, and a bearing member connected to the curtain near the edges of the opening therein, said member including relatively thin ring sections each of which is formed with an annular flange and a series of projections, some of said projections being adapted to form centering and guiding means for the dust guard when positioned in the well and other of said projections being adapted to connect the ring sections to the curtain.

9. A dust guard of the class described involving a top supporting bar, a curtain of flexible material carried by said bar and having an opening adapted to receive a journal, the edge of the said opening being adapted to wipe the journal, and a metallic member connected to said curtain and adapted to surround the said opening, said member being spaced from the side edges of said curtain and adapted to provide a reinforcement therefor, said member being formed with an annular flange adapted to be separated from the journal by an intervening space.

10. The combination with a journal and a box receiving the journal, said box having a pocket in its inner portion extending above and below and at the sides of the journal, dust-guard supporting means provided on said box, a flexible curtain hung from said supporting means and having its side and lower edges free to swing axially of the journal and also being provided with an opening adapted to receive the journal, the edge of the curtain adjacent said opening being adapted to wipe the journal, and a metallic reinforcement surrounding the journal and separated therefrom by an intervening space, said reinforcement being provided with means formed integral therewith for attaching the same to the curtain and having projections for limiting the swinging movement, said reinforcement also being designed to lend weight to the curtain for contributing to the swinging capacity thereof.

11. A dust guard for journal boxes and the like comprising a flexible curtain having an opening therein adapted to receive a journal, the edge of the curtain adjacent said opening being adapted to contact said journal, and a relatively thin member connected to the curtain near the edge of the opening therein, said member being provided with an annular flange forming a bearing portion and having a peripheral edge adapted to be bent to provide offset projections designed to center the dust guard in the well.

12. A dust guard for journal boxes and the like comprising a flexible curtain having an opening therein adapted to receive a journal, the edge of the curtain adjacent said opening being adapted to contact said journal, and relatively thin metallic ring-like sections forming a bearing member, the peripheral edge of each of said sections describing a polygon in which the corners formed at the juncture of adjacent sides thereof are adapted to be bent to provide continuous but offset portions on said ring section for centering the dust guard when positioned within the well.

13. A dust guard for journal boxes and the like comprising a flexible curtain having an opening therein adapted to receive a journal, the edge of the curtain adjacent said opening being adapted to contact said journal, and relatively thin metallic ring sections connected to the curtain upon opposite sides thereof and in close proximity to the edge of the opening formed in said curtain, each of said sections being formed with an internal circular flange and a peripheral edge consisting of a plurality of substantially straight portions, said peripheral edge being bent at intervals and across adjacent straight portions thereof to form offset projections adapted to center the dust guard in the well.

14. A dust guard for journal boxes and the like comprising a flexible curtain having an opening therein adapted to receive a journal, the edge of the curtain adjacent said opening being adapted to contact said journal, and relatively thin metallic ring sections connected to the curtain upon opposite sides thereof in close proximity to the edge of the opening formed in said curtain, each of said sections including a bearing portion and a hexagonally shaped periphery, said periphery being bent across the point provided at the juncture of adjacent hexagonal sides, the bending of said periphery serving to provide a plurality of offset portions adapted to guide the dust guard within the well.

15. A metallic reinforcement for a flexible dust guard curtain comprising a pair of relatively thin ring-like members provided with flexible integral means for connecting the same to the opposite sides of an associated curtain, each of said members having projecting therefrom means for centering such a curtain within the well of a journal box.

16. A metallic reinforcement for a flexible dust guard curtain comprising a relatively thin member adapted to be spaced from the side edges of such a curtain and provided with an integral flange adapted to provide a collar portion adapted to surround a journal and having a plurality of integral projections, some of which are adapted to extend through and form attaching means for said member to an associated curtain and others of which are designed to provide centering means for such a curtain when positioned in the well.

In testimony whereof I affix my signature.
DONALD S. BARROWS.